(12) United States Patent
Weinberg

(10) Patent No.: US 9,081,213 B2
(45) Date of Patent: Jul. 14, 2015

(54) INTERCHANGEABLE FRAMES FOR EYEGLASSES

(71) Applicant: Fredrick Lewis Weinberg, Weeki Wachee, FL (US)

(72) Inventor: Fredrick Lewis Weinberg, Weeki Wachee, FL (US)

(73) Assignee: Fredrick Lewis Weinberg, Weeki Wachee, FL (US)

( * ) Notice: Subject to any disclaimer, the term of this patent is extended or adjusted under 35 U.S.C. 154(b) by 0 days.

(21) Appl. No.: 14/109,025

(22) Filed: Dec. 17, 2013

(65) Prior Publication Data

US 2015/0168745 A1 Jun. 18, 2015

(51) Int. Cl.
*G02C 1/06* (2006.01)
*G02C 11/02* (2006.01)

(52) U.S. Cl.
CPC ..................... *G02C 11/02* (2013.01)

(58) Field of Classification Search
CPC ...... G02C 11/02; G02C 2200/08; G02C 9/00; G02C 7/086
USPC ............. 351/86, 83, 106, 103, 47, 57, 48, 58, 351/51, 52, 130
See application file for complete search history.

(56) References Cited

U.S. PATENT DOCUMENTS

| | | | | |
|---|---|---|---|---|
| 3,838,914 | A * | 10/1974 | Fernandez | 351/106 |
| 4,685,782 | A * | 8/1987 | Lhospice | 351/130 |
| 5,181,051 | A | 1/1993 | Townsend et al. | |
| 5,321,444 | A * | 6/1994 | Lin | 351/86 |
| 6,186,624 | B1 * | 2/2001 | Wang | 351/140 |
| 6,585,370 | B2 * | 7/2003 | Zelman | 351/103 |
| 7,014,313 | B1 * | 3/2006 | Lee et al. | 351/47 |
| 7,452,068 | B2 * | 11/2008 | Collier et al. | 351/47 |
| 7,726,807 | B2 * | 6/2010 | Van Atta et al. | 351/103 |
| 2007/0273823 | A1 | 11/2007 | Lee et al. | |
| 2011/0051074 | A1 * | 3/2011 | Arnell | 351/47 |
| 2011/0080555 | A1 | 4/2011 | Chow | |
| 2012/0133883 | A1 | 5/2012 | Mezher | |

FOREIGN PATENT DOCUMENTS

| | | |
|---|---|---|
| EP | 1251388 | 12/2005 |
| EP | 1647854 | 4/2006 |
| FR | 2900743 | 1/2006 |
| GB | 855268 | 11/1960 |
| GB | 881494 | 11/1961 |

* cited by examiner

*Primary Examiner* — Hung Dang
(74) *Attorney, Agent, or Firm* — Brick Gentry PC; Brian J. Laurenzo; Jessica L. Susie

(57) ABSTRACT

An interchangeable frame for eyeglasses is disclosed including a first lens, a second lens, an interchangeable frame portion, and at least one selectively engageable connection between the interchangeable frame portion and at least one of the first and second lenses. The interchangeable frame portion may include a first temple, second temple, and linking portion between the first and second temples. The first and second lens may be surrounded and/or connected by a lens frame portion. The selectively engageable connection may include at least one of a magnet and a screw. The interchangeable frame portion is interchangeable with the first and second lens. Accordingly, a user may selectively interchange the interchangeable frame portion, such as to change the decorative or ornamental appearance of the eyeglasses.

14 Claims, 4 Drawing Sheets

INTERCHANGEABLE FRAMES FOR EYEGLASSES

FIELD OF THE INVENTION

The present invention relates to eyeglasses. More specifically, the present invention relates to eyeglasses having interchangeable frames, allowing the user to selectively change the look of his glasses at his convenience.

BACKGROUND

Eyeglasses, also known as spectacles or glasses are known. Oftentimes, eyeglasses are worn to aid or correct vision and to protect the eyes, such as from sunlight or debris. Eyeglasses may also be worn for cosmetic reasons or as a fashion accessory. A pair of eyeglasses has several typical components. Two tenses are located in front of the user's eyes. The two lenses may be connected by a bridge. Nose pads may also be located between the lenses, near the bridge. The lenses may be surrounded by a frame, although the lenses may be all or partially frameless. A hinge connects the frame or lenses to two temple pieces. When worn, the temples extend back from the user's face towards the ears. Each temple is connected to an earpiece which at least partially wraps around the user's ear.

Oftentimes a user will have a small number of eyeglasses, such as one or two pairs of eyeglasses, which are worn on a regular basis, such as daily. The frame, bridge, temples, and earpieces of the eyeglasses may be decorative or ornamental, such as colored or having a pattern. Attempts have been made in the past to create eyeglasses with removable portions. However, assemblies of the past are inefficient and do not provide a simple, effective way to change the entire look of the eyeglasses.

Most previous attempts to create eyeglasses with removable portions include an entire primary pair of eyeglasses that may receive removable, decorative pieces. For example, European Patent Application No. 1,251,388 discloses a design wherein a pair of eyeglasses having a permanent frame, temples, and earpieces may receive an ornamental bottom frame which is detachable and interchangeable to allow the appearance of eyeglasses to be changed. U.S. Patent Application Publication No. 2007/073823 discloses a spectacles and ornament assembly. The spectacles include lenses, a bridge between the lenses, a complete frame surrounding the lenses, and temples. One or more removable ornaments may be attached to the spectacles. For example, an ornamental piece may cover the entire front of the frames, the top or bottom half of the frames, or the temples.

French Publication Number 2,900,743 provides an arrangement wherein a top, decorative piece may be added to a primary eyeglasses frame to cover the top half of the front of the frames. Likewise, European Patent Application No. 1,647,854 discloses an ornamental, partial eyeglasses frame, similar to a frame without lenses. The ornamental frame may be attached to the primary eyeglasses frame. U.S. Pat. No. 5,181,051 discloses a magnetic, removable display for eyeglasses. A primary, metal eyeglasses frame may receive removable printed matter, generally in the form of two partial fronts that each surrounds one lens. In addition, the frames may receive removable temple pieces. Similarly, clip-on sunglasses are known in the art, which provide a full, front overlay to a pair of eyeglasses, including sunglasses lenses and oftentimes at least a partial frame.

Other attempts to create eyeglasses with interchangeable ornamental portions include very small decorative pieces that may be attached to the eyeglasses. United Kingdom Patent Specification No. 881,494 discloses a spectacle frame having a detachable member. The detachable member is a small ornamental facing, which is located near the top of the front side of the spectacle frame. Similarly, United Kingdom Patent Specification No. 855.268 discloses eyeglasses having a removable, ornamental piece which may be located in the top corner of the frames. U.S. Patent Application Publication No. 2012/0133883 discloses removable, decorative side panels which may attach to the temple pieces of a pair of eyeglasses. Furthermore, U.S. Patent Application Publication No. 2011/0080555 discloses an eyeglasses mounting system for eyeglasses that includes a decorative component which may be removably attached to the eyeglasses. The decorative component is generally U-shaped to slide over an eyeglasses temple.

Although the above-described references provide interchangeable components for eyeglasses, none provides a simple, efficient way to change the entire look of the pair of eyeglasses rather than simply a portion of the glasses. For example, many of the references provide a small, interchangeable, ornamental piece which may be located on the sides, such as the temples, or front of the eyeglasses. Other references provide an ornamental front, but the temples of the glasses remain permanent. Therefore, the entire look of the eyeglasses is not changed. Accordingly, there exists a need in the art to simply and efficiently change the frame and temples of a pair of eyeglasses.

SUMMARY

In one embodiment, the present invention provides an interchangeable frame for eyeglasses comprising first and second lenses, in addition, the eyeglasses include an interchangeable frame portion comprising a first temple, second temple, and a linking portion. The linking portion connects the first temple and the second temple. The eyeglasses further comprise at least one selectively engageable connection between the interchangeable frame portion and at least one of the first lens and the second lens. In some embodiments, the first lens and the second lens may be surrounded by a lens frame portion and/or connected by a bridge. Furthermore, the linking portion of the interchangeable frame portion may be selectively removable from the lens frame portion, and in some embodiments, the linking portion may attach to the top of the lens frame portion. The selectively engageable connection may comprise a magnet, a screw, or both. In addition, the linking portion of the interchangeable frame portion may be ornamental.

In another embodiment of the present invention, an interchangeable frame for eyeglasses is provided. The eyeglasses comprise a first lens, a second lens, and a lens frame portion connecting the first and second lenses. Also included is an interchangeable frame portion comprising a first temple, a second temple, and a linking portion connecting the first and second temples. Furthermore, the eyeglasses comprise at least one selectively engageable connection between the interchangeable frame portion and at least one of the first lens, second lens, and lens frame portion. Accordingly, a user may selectively interchange the first interchangeable frame portion with a second interchangeable frame portion. The selectively engageable connection may comprise a magnet and further comprise a screw. In some embodiments, the linking portion is located above the first and second lenses with the interchangeable frame portion selectively engaged with at least one of the first lens, second lens, and lens frame portion.

In yet another embodiment, an interchangeable eyeglasses kit is provided. The kit includes a first lens and a second lens connected by a lens frame portion. Furthermore, a first interchange frame portion having a first temple, second temple, and a first linking portion connecting the first and second temples are included in the kit. Also present is a second interchangeable frame portion having a third temple, fourth temple, and a second linking portion connecting the third and fourth temples. The first and second lenses are selectively engageable with the first and second interchangeable frame portion. Accordingly, a user may selectively interchange the first interchangeable frame portion with the second interchangeable frame portion.

DETAILED DESCRIPTION

The following is a detailed description of an embodiment of eyeglasses 100 of the present invention. For ease of discussion and understanding, the following detailed description and illustrations refer to the invention in association with eyeglasses; however, it should be understood that this term is not limited to eyeglasses that aid in correcting or enhancing vision. Rather, the term is inclusive of all types of devices for the eyes which include lenses, including, but not limited to, spectacles, sunglasses, and safety glasses.

Figure 1:
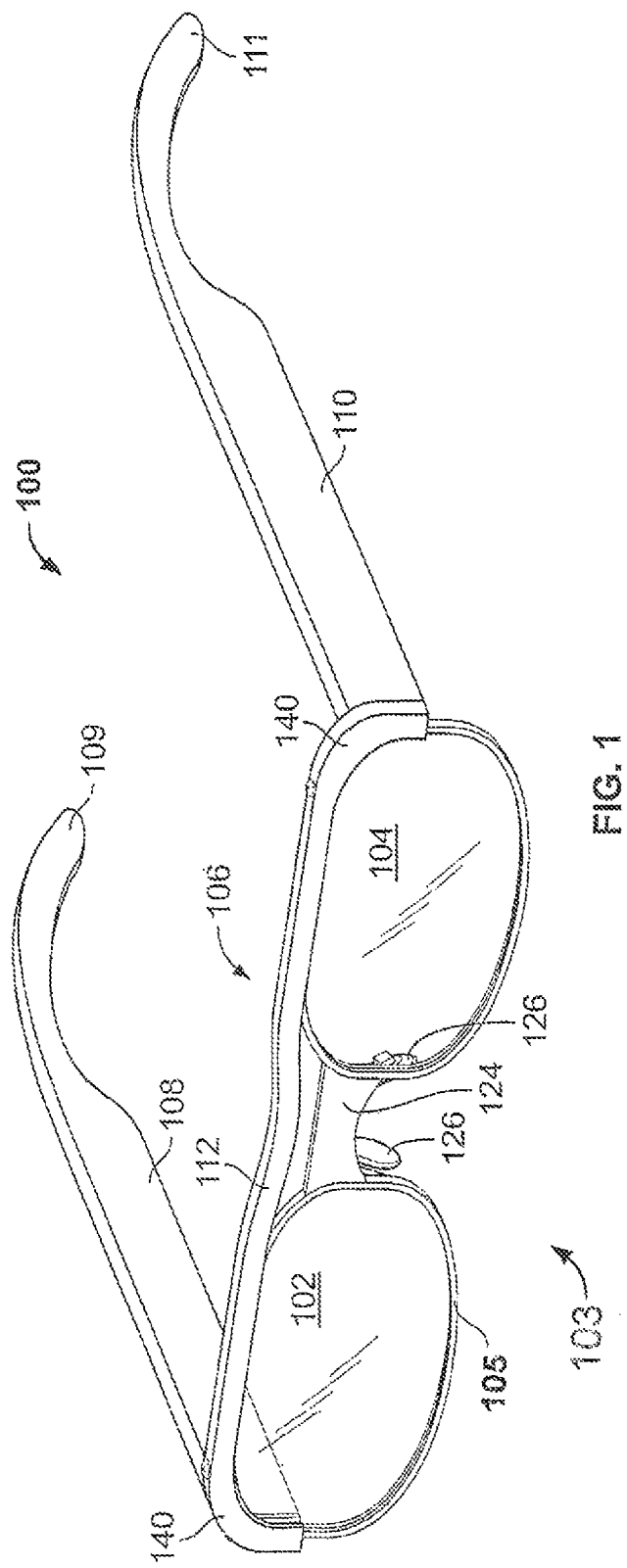
FIG. 1 is a perspective view according to one embodiment of eyeglasses of the present invention.

Referring to FIG. 1, a pair of eyeglasses 100 is shown. The eyeglasses 100 include a first lens 102 and a second lens 104. In the illustrated embodiment, the lenses 102, 104 are part of an eye piece 103, which includes a lens frame portion 105. The lens frame portion 105 surrounds the lenses 102, 104 in the illustrated embodiment, although it is anticipated that other embodiments of the present invention will not include a lens frame portion 105 at all or one that completely surrounds the lenses 102, 104. For example, the lens frame portion 105 may simply span the tops of the lenses 102, 104 to connect same. The lenses 102, 104 may be secured to the lens frame portion 105 by screws. The lenses 102, 104 may also include a bridge 124 and nose pads 126, although it is anticipated that some embodiments of the eyeglasses 100 will not include a bridge 124 and/or nose pads 126. Furthermore, it is possible that in some embodiments, the lenses 102, 104 may not be connected to each other except when engaged with an Interchangeable frame portion 106, as will be discussed below.

Also shown is the interchangeable frame portion 106. The interchangeable frame portion 106 includes a first temple 108, a second temple 110, and a Sinking portion 112. At least a portion of the interchangeable frame portion 106 may be decorative. For example, one or more of the first temple 108, second temple 110, and linking portion 112 may be ornamental or decorative, such as including a color or a design. The first temple 108 and second temple 110 are attached to a first ear piece 109 and second ear piece 111, respectively. The first ear piece 109 and second ear piece 111 may also be ornamental or decorative, such as including the color or design of the first temple 108 and second temple 110. In addition, the eyepiece 103, specifically the first lens 102 and second lens 104, and interchangeable frame portion 106 include selectively engageable connections 114, which can be seen in FIG. 2.

Figure 2:
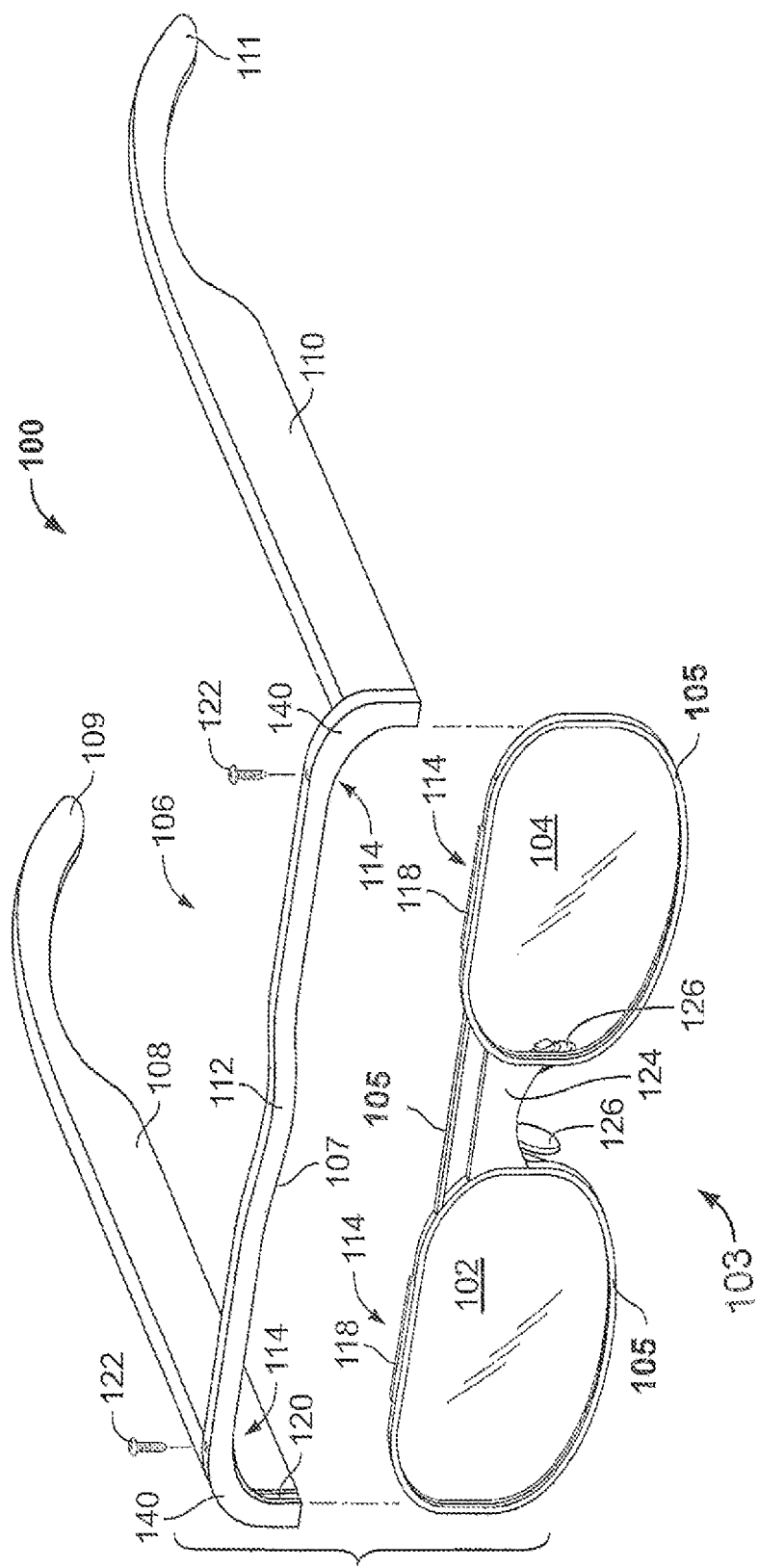
FIG. 2 is an exploded view according to one embodiment of the eyeglasses of FIG. 1.

Turning to FIG. 2, an exploded view of the eyeglasses 100 is shown. Specifically, the exploded view of FIG. 2 shows the eyepiece 103 and interchangeable frame portion 106 apart from each other. Accordingly, the selectively engageable connections 114 between the interchangeable frame portion 106, and lenses 102, 104 are shown in detail. In the illustrated embodiment, the selectively engageable connections 114 are located on the interchangeable frame portion 106 and lens frame portion 105. More specifically, in the preferred embodiment, the selectively engageable connections 114 connect the linking portion 112 of the interchangeable frame portion 106 and lens frame portion 105. Referring again, to FIG. 2, the interchangeable frame portion 106 is selectively engageable with the lens frame portion 105 to attach to the top of the lens frame portion 105 and, accordingly, is located above the first lens 102 and second lens 104 in the assembled position. However, it is anticipated that the selectively engageable connections 114 may connect the lenses 102, 104 and interchangeable frame portion 106 in a number of ways, which will be readily apparent to one skilled in the art. For example, the selectively engageable connection may be on the lenses 102, 104 themselves, the temples 108, 110, or other components.

Returning again to FIG. 2. in the illustrated embodiment, the selectively engageable connections 114 may include magnetic attraction and/or screws. It is anticipated that any type of connection, known now or in the future, may be used. Moreover, it is anticipated that more or fewer connections may be used than shown and that more or less than two types of connections may be used. In particular, in the preferred embodiment, the interchangeable frame portion 106 and lens frame portion 105 are connected to each other via magnetic attraction. In the illustrated embodiment, the lens frame portion 105 includes metal portions 118, while the interchangeable frame portion includes magnets 120. The interchangeable frame portion magnets 120 span the entire bottom 107 of the interchangeable frame portion 106 linking portion 112. It is anticipated that magnetic attraction between, the interchangeable frame portion 106 and lens frame portion 105 may be effected in many ways which will be apparent to one skilled in the art. For example, the metal portions 118 may be located on the interchangeable frame portion 106, while the magnets may be located on the lens frame portion 105 or elsewhere on the eyepiece 103. In addition, one of the interchangeable frame portion 106 and lens frame portion 105 may be metal, thus reducing or eliminating the need for further metal portions 118. Alternatively, both the interchangeable frame portion 106 and eyepiece 103 may include magnets that are configured to attract each other. In addition to magnetic force, the first lens 102 and second lens 104 may be held in place with respect to the interchangeable frame portion 106 by screws 122. For example, a screw 122 may be located, at the outer corners of the lens frame portion 105 and the corners 140 of the linking portion 112. It is anticipated that screws 122 could be used in addition to or in place of magnetic attraction. As discussed in detail above, the connections 114 are each selectively engageable. As such, a user may easily and efficiently change the look, of the eyeglasses, including the frame and temples. Although in the preferred embodiment, magnetic force is used to connect the interchangeable frame portion 106 and lens frame portion 105, it is anticipated that or other types of connections known now or in the future may be employed.

As discussed above, the eyeglasses of the present invention may include spectacles, sunglasses, safety glasses, and other types of eyeglasses. Accordingly, the first lens 102 and second lens 104 may take many forms, including shape, color, and material. Further, the lenses 102, 104 may be prescription lenses, over the counter lenses, or another type of lens known in the art, now or in the future, and made of any satisfactory material for making lenses known in the art, now or in the future. As such, the eyepiece 103 may be any shape to accommodate the lenses 102, 104 employed. In addition, the interchangeable frame portion 106 and lens frame portion 105 may take many forms without departing from the scope of the invention. Both the interchangeable frame portion 106 and lens frame portion 105 may be any material known in the art, now or in the future, capable of providing an eyeglasses frame. For example, the interchangeable frame portion 106 and lens frame portion 105 may be metal, plastic, or another material. Furthermore, in some embodiments, the interchangeable frame portion 106 and lens frame portion 105 may be made of the same material, while in other embodiments the interchangeable frame portion 106 and lens frame portion 105 may be made of different materials.

Figure 3:
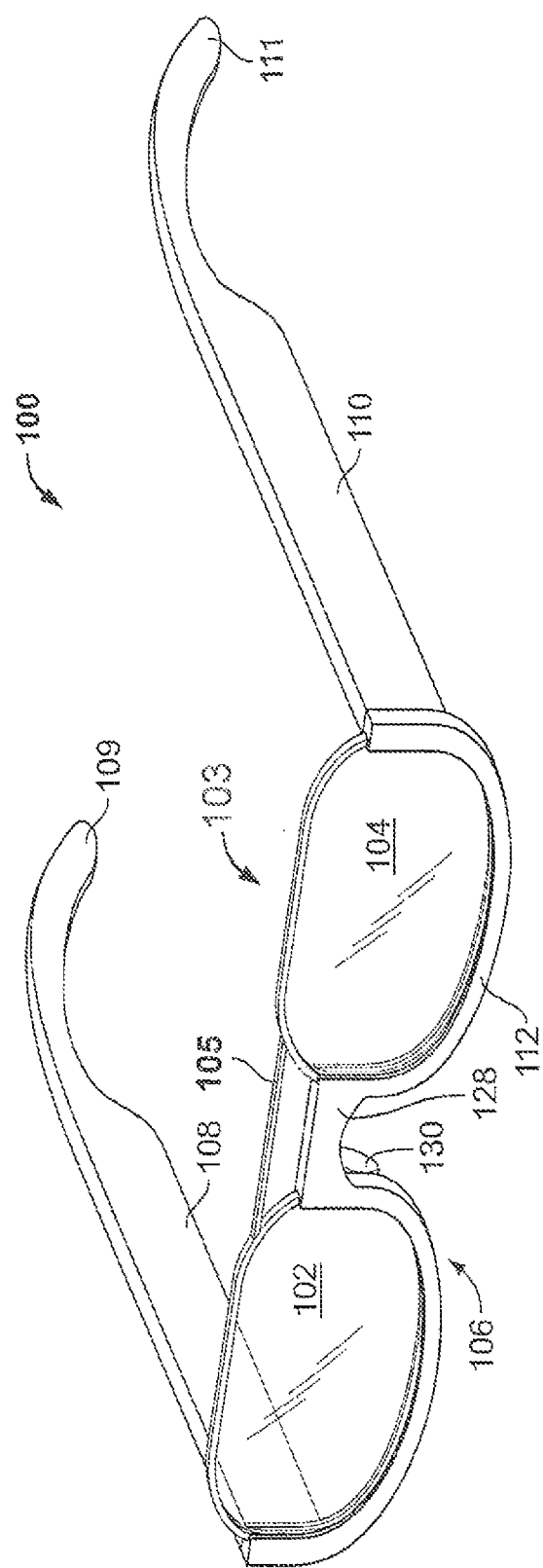
FIG. 3 is a perspective view according to a second embodiment of eyeglasses of the present invention wherein the linking portion of the first, decorative frame portion is located below the first and second lenses when the first, decorative frame portion is engaged with the lenses and lens frame portion.

Turning to FIG. 3, a second embodiment of eyeglasses 100 of the present invention are shown. The eyeglasses 100 include an eyepiece 103 having a first lens 102 and a second lens 104, The first lens 102 and second lens 104 are held together by a lens frame portion 105. In the embodiment of FIG. 3, the lens frame portion 105 encircles both the first lens 102 and second lens 104. However, it is anticipated that in other embodiments, the lens frame portion 105 will not completely encircle the first lens 102 and the second lens 104 or may not be present at all.

Also included in the eyeglasses 100 of FIG. 3 is an interchangeable frame portion 106, such as a decorative frame portion or an ornamental frame portion. The interchangeable frame portion 106 includes a first temple 108 and a second temple 110. The first temple 108 and second, temple 110 are each connected to a first ear piece 109 and a second ear piece 111, respectively. Between the first temple 108 and second temple 110 is a linking portion 112. At least one of the first temple 108, first ear piece 109, second temple 110, second ear piece 111, and linking portion 112 may be decorative or ornamental, such as by including a color, pattern, and/or decorative shape. Referring again to FIG. 3, the interchangeable frame portion 106 is selectively engageable with the eyepiece 103, and more specifically the lens frame portion 105, to attach to the bottom of the lens frame portion 105 and, accordingly, is located generally below the eyepiece 103 in the assembled position.

In the embodiment of FIG. 3, the interchangeable frame portion 106 includes an interchangeable frame portion bridge 128. The eyepiece 103 need not include a bridge in this embodiment. However, it is anticipated that in some embodiments, the interchangeable frame portion bridge 128 may accept a bridge located between the first lens 102 and second lens 104. In this way, the same eyepiece 103 may be used with interchangeable frame portions 106 of either embodiment. Furthermore, the eyepiece 103 includes lens frame portion nose pads 130, although it is anticipated that nose pads may not be present in all embodiments.

Although not shown in the view of FIG. 3, the second embodiment of the eyeglasses 100 further includes selectively engageable connections between the interchangeable frame portion 106 and the lens frame portion 105, which may be similar to the selectively engageable connections 114 shown in FIGS. 1 and 2. For example, in the preferred embodiment the eyeglasses 100 include magnets for engaging the interchangeable frame portion 106 with at least one of the first lens 102 and the second lens 104. In one embodiment, the lens frame portion 105 may include metal portions 118 while the interchangeable frame portion 106 includes magnets 120. It is anticipated that magnetic attraction between the interchangeable frame portion 106 and eyepiece 103 may be effected in many ways which will be apparent to one skilled in the art. For example, metal portions may be located on the interchangeable frame portion 106, while magnets may be located on the eyepiece 103. In addition, one of the interchangeable frame portion 106 and lens frame portion 105 of the eyepiece 103 may be metal, thus reducing or eliminating the need for added metal portions. Alternatively, both the interchangeable frame portion 106 and eyepiece may include magnets that are configured to attract each other. In an alternate embodiment, the first lens 102 and second lens 104 may also be held in place with respect to the interchangeable frame portion 106 by screws. Such screws may be located at the outer corners of the eyepiece 103. It will be understood by one of skill in the art that any type of selectively engageable connection known in the art, now or in the future, may be used.

As noted above, the connections are selectively engageable. Accordingly, the user may interchange the interchangeable frame portion 106 with the eyepiece 103 as desired. As discussed above, in the preferred embodiment, magnetic force is used to connect the interchangeable frame portion 106 and eyepiece 103. In some embodiments, it is anticipated that multiple types of connections may be employed, such as both magnetic force and a screw, or other types of connections known now or in the future.

Similar to the first embodiment, eyeglasses of the second illustrated embodiment may include spectacles, sunglasses, safety glasses, and other types of eyeglasses. Accordingly, the first lens 102 and second lens 104 may take many forms, including shape, color, and material. Further, the lenses 102, 104 may be prescription lenses, over the counter lenses, or any other type of lens known in the art, now or in the future. In addition, the interchangeable frame portion 106 and lens frame portion 105 may take many forms without departing from the scope of the invention. Both the interchangeable frame portion 106 and lens frame portion 105 may be any material known in the art, now or in the future, capable of providing an eyeglasses frame. For example, the interchangeable frame portion 106 and lens frame portion 105 may be metal, plastic, or another material. Furthermore, in some embodiments, the interchangeable frame portion 106 and lens frame portion 105 may be made of the same material, while in other embodiments the interchangeable frame portion 106 and lens frame portion 105 may be made of different materials.

Figure 4:
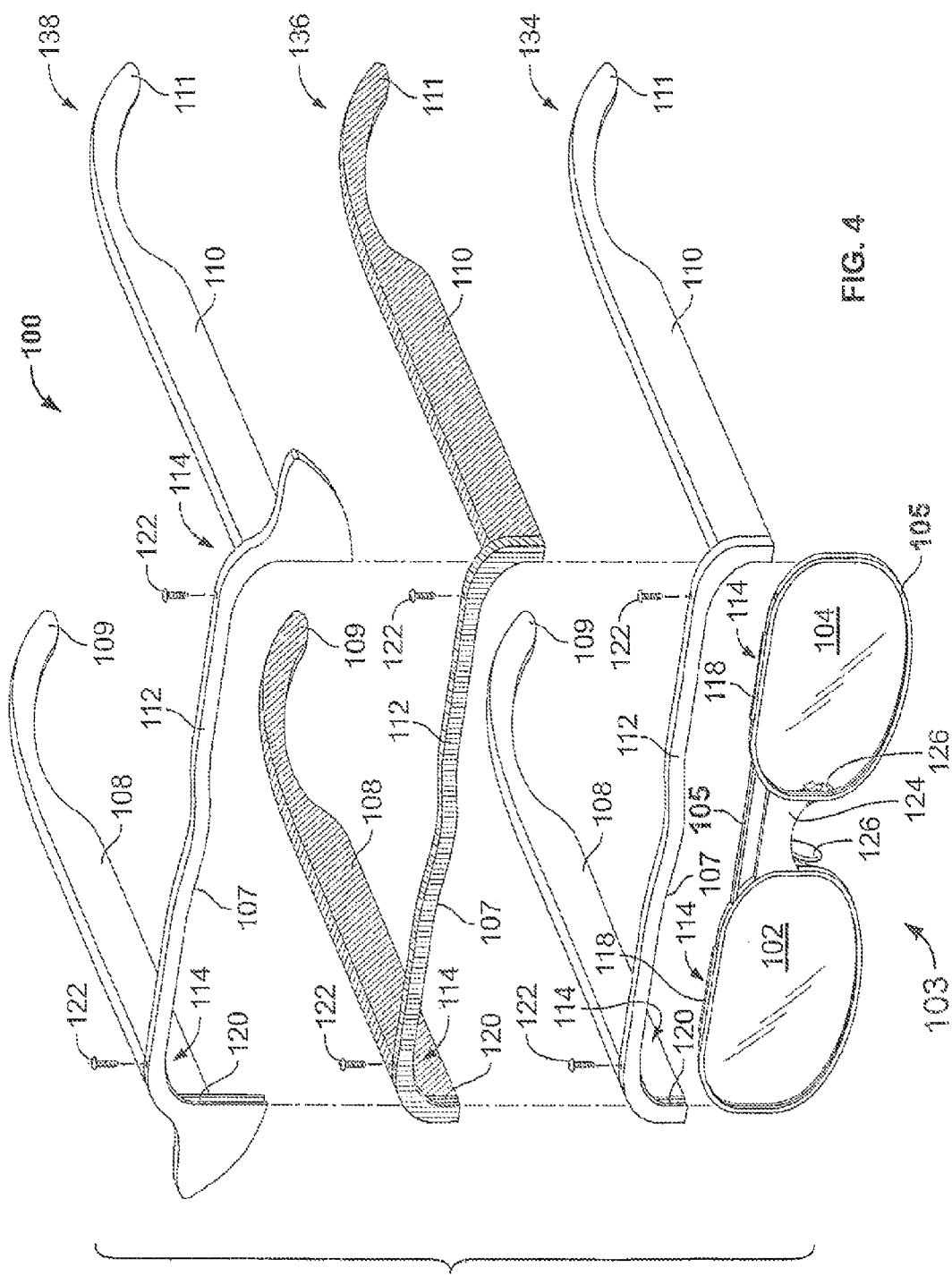
FIG. 4 shows alternative exploded views of the eyeglasses of FIG. 1 with first, second, and third interchangeable frame portions which may be selectively interchanged for connection to the second, lens frame portion.

Turning to FIG. 4, several examples of the first embodiment of eyeglasses 100 with interchangeable frames are shown. Shown is the eyepiece 103, which includes the first lens 102 and second lens 104, as well as a lens frame portion 105. Furthermore, a bridge 124 is located between the first lens 102 and second lens 104. In addition, nose pads 126 are attached to the eyepiece 103. The nose pads 126 may be attached to the lenses 102, 104 directly, or may be attached to the lens frame portion 105. In addition, the first lens 102 and second lens 104 include selectively engageable connection means 114. Specifically, metal portions 118 are shown, which are attracted to magnets 120, as will be discussed below. It will be understood by one of skill in the art that in some embodiments, the lens frame portion 105 may be metal. In such an embodiment, it may not be necessary to include metal portions 118.

A first interchangeable frame 134, also called an interchangeable frame portion or a decorative frame portion, is shown. The first interchangeable frame 134 includes a first temple 108 and a second temple 110, which are each attached to a first ear piece 109 and second ear piece 111, respectively. The first interchangeable frame 134 also includes a linking portion 112. The linking portion 112 is located between the first temple 108 and second temple 110. The linking portion 112 also includes at least one selectively engageable connection 114. In the illustrated embodiment, the first interchangeable frame 134 includes a magnet 120 which spans the bottom 107 of the linking portion 112. Alternatively, screws 122 are also shown 122 which may likewise be used to selectively engage the eyepiece 103 and first interchangeable frame 134. The first interchangeable frame 134 has a first ornamental appearance, such as being a solid, light color.

Also shown in FIG. 4 is a second interchangeable frame 136. The second interchangeable frame 136 is largely similar to the first interchangeable frame 134. However, the second interchangeable frame 136 has a second ornamental appearance, such as including a striped design. A third interchangeable frame 138 is also shown, which is similar to the first interchangeable frame 134 and second interchangeable frame 136. However, the third interchangeable frame 138 has a third ornamental appearance. Specifically, the third interchangeable frame includes a different shape than the others by having a cat eye shape in the corners. The second and third interchangeable frames 136 and 138 also have magnets 120 to attract, the metal, portions 118 of the lens frame portions 105. As discussed in detail above, however, it is anticipated that any one or more selectively engageable connections may be used to connect the first, second, and third 134, 136, 138 interchangeable frames to the eyepiece 103. Accordingly, a user may easily and efficiently change the entire look of his eyeglasses by interchanging the frames.

Although various representative embodiments of this invention have been described above with a certain degree of particularity, those skilled in tire art could make numerous alterations to the disclosed embodiments without departing from the spirit or scope of the inventive subject matter set forth in the specification and claims. Joinder references (e.g. attached, adhered, joined) are to be construed broadly and may include intermediate members between a connection of elements and relative movement between elements. As such, joinder references do not necessarily infer that two elements are directly connected and in fixed relation to each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace ail known or earlier developed alternatives, modifications, variations, improvements, and/or substantial equivalents.

The invention claimed is:

1. An interchangeable frame for eyeglasses comprising:
   a first lens;
   a second lens;
   at least one of said first and second lenses including at least one nose pad;
   an ornamental interchangeable frame portion comprising a first temple, a second temple, and a linking portion connecting said first temple and said second temple;
   at least one selectively engageable connection between said interchangeable frame portion and at least one of said first lens and said second lens; and
   wherein said ornamental interchangeable frame portion is interchangeable with a second ornamental interchangeable frame portion and wherein said first and second ornamental interchangeable frame portions have different appearances.

2. The apparatus of claim 1 wherein said first lens and said second lens are surrounded by a lens frame portion.

3. The apparatus of claim 2 wherein said linking portion is selectively removable from said lens frame portion.

4. The apparatus of claim 3 wherein said at least one selectively engageable connection connects said linking portion to the top of said lens frame portion.

5. The apparatus of claim 3 wherein a bridge connects said first lens and said second lens.

6. The apparatus of claim 1 wherein said at least one selectively engageable connection comprises a magnet.

7. The apparatus of claim 1 wherein said at least one selectively engageable connection comprises a screw.

8. The apparatus of claim 1 wherein said at least one selectively engageable connection comprises a magnet and a screw.

9. The apparatus of claim 1 wherein said linking portion is ornamental.

10. An interchangeable frame for eyeglasses comprising:
    a first lens and a second lens, said first and second lenses connected by a lens frame portion;
    an ornamental interchangeable frame portion comprising a first temple, a second temple, and a linking portion connecting said first temple and said second temple;
    at least one selectively engageable connection between said interchangeable frame portion and at least one of said first lens, second lens, and lens frame portion;
    wherein a user may selectively interchange said ornamental interchangeable frame portion with a second ornamental interchangeable frame portion; and
    wherein said first and second ornamental interchangeable frame portions have different ornamentation.

11. The apparatus of claim 10 wherein said at least one selectively engageable connection comprises a magnet.

12. The apparatus of claim 11 wherein said at least one selectively engageable connection further comprises a screw.

13. The apparatus of claim 10 wherein said linking portion is located above said first lens and said second lens when said interchangeable frame portion is selectively engaged with at least one of said first lens, second lens, and lens frame portion.

14. An interchangeable eyeglasses kit comprising:
- a first lens and a second lens, said first and second lenses connected by a lens frame portion;
- a first interchangeable frame portion having a first appearance and comprising a first temple, a second temple, and a first linking portion connecting said first and second temples;
- a second interchangeable frame portion having a second appearance and comprising a third temple, a fourth temple, and a second linking portion connecting said third and fourth temples;
- said first and second lenses selectively engageable with said first and second interchangeable frame portions; and
- wherein a user may selectively interchange said first interchangeable fame portion with said second interchangeable frame portion, thus selectively interchanging the appearance of said eyeglasses.

* * * * *